(No Model.) 3 Sheets—Sheet 1.
C. J. REED.
CONDUIT ELECTRIC RAILWAY.

No. 521,891. Patented June 26, 1894.

Witnesses
C. E. Ashley
G. W. Chamberlain

Inventor
Chas J. Reed
By his Attorney
Charles J. Kintner (No Model.) 3 Sheets—Sheet 2.

C. J. REED.
CONDUIT ELECTRIC RAILWAY.

No. 521,891. Patented June 26, 1894.

Witnesses
C. E. Ashley
G. W. Chamberlain

Inventor
Charles J. Reed
By his Attorney
Charles J. Kintner (No Model.) 3 Sheets—Sheet 3.

C. J. REED.
CONDUIT ELECTRIC RAILWAY.

No. 521,891. Patented June 26, 1894.

Witnesses
C. E. Ashley
G. W. Chamberlain.

Inventor
Charles J. Reed
By his Attorney
Charles J. Kintner

THE NATIONAL LITHOGRAPHING COMPANY,
WASHINGTON, D. C.

UNITED STATES PATENT OFFICE.

CHARLES J. REED, OF ORANGE, NEW JERSEY, ASSIGNOR, BY DIRECT AND MESNE ASSIGNMENTS, TO THE REED ELECTRIC COMPANY, OF PHILADELPHIA, PENNSYLVANIA.

CONDUIT ELECTRIC RAILWAY.

SPECIFICATION forming part of Letters Patent No. 521,891, dated June 26, 1894.

Application filed April 14, 1892. Serial No. 429,184. (No model.)

*To all whom it may concern:*

Be it known that I, CHARLES J. REED, a citizen of the United States, residing at Orange, in the county of Essex and State of New Jersey, have invented certain new and useful Improvements in Electric Railways, of which the following is a specification.

My invention is directed particularly to improvements in that type of electric railways known as conduit systems in which the propelling current of electricity is taken from one or more conductors located in a conduit substantially on a level with or below the surface of the earth and in which trolleys are used for conveying the current to propelling electric motors, one or more, carried by the moving car or vehicle, and it has for its objects first the arrangement of the current mains or conductors in such a way that two or more trolleys may be located in alignment with each other in the slit of the conduit and in such manner that they may be raised entirely out of it and manipulated at will. Second to provide perfectly insulated current mains in a conduit and to locate them in such way that they are subjected to a minimum current leakage effect. Third to simplify and cheapen the construction of this type of apparatus, and fourth to accomplish the several results naturally attributable to the several parts of the entire system and structure of apparatus hereinafter described, the novel features of which are particularly pointed out in the claims at the end of this specification.

In order that a full, clear and exact understanding of all the details of my invention may be had by those skilled in the art to which it most nearly relates, reference is hereby had to the accompanying drawings and the following description thereof.

Figure 1:
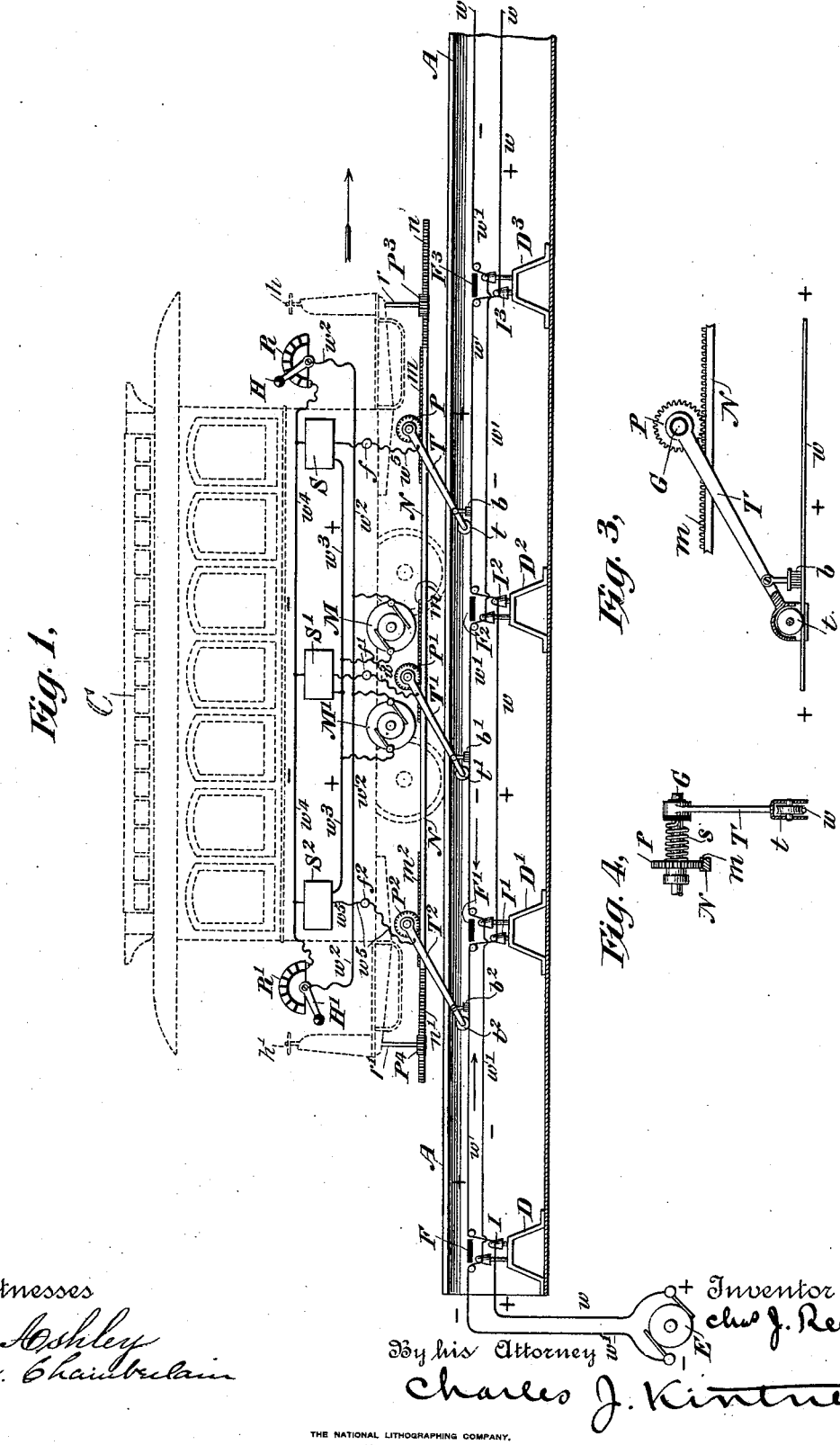
Figure 2:
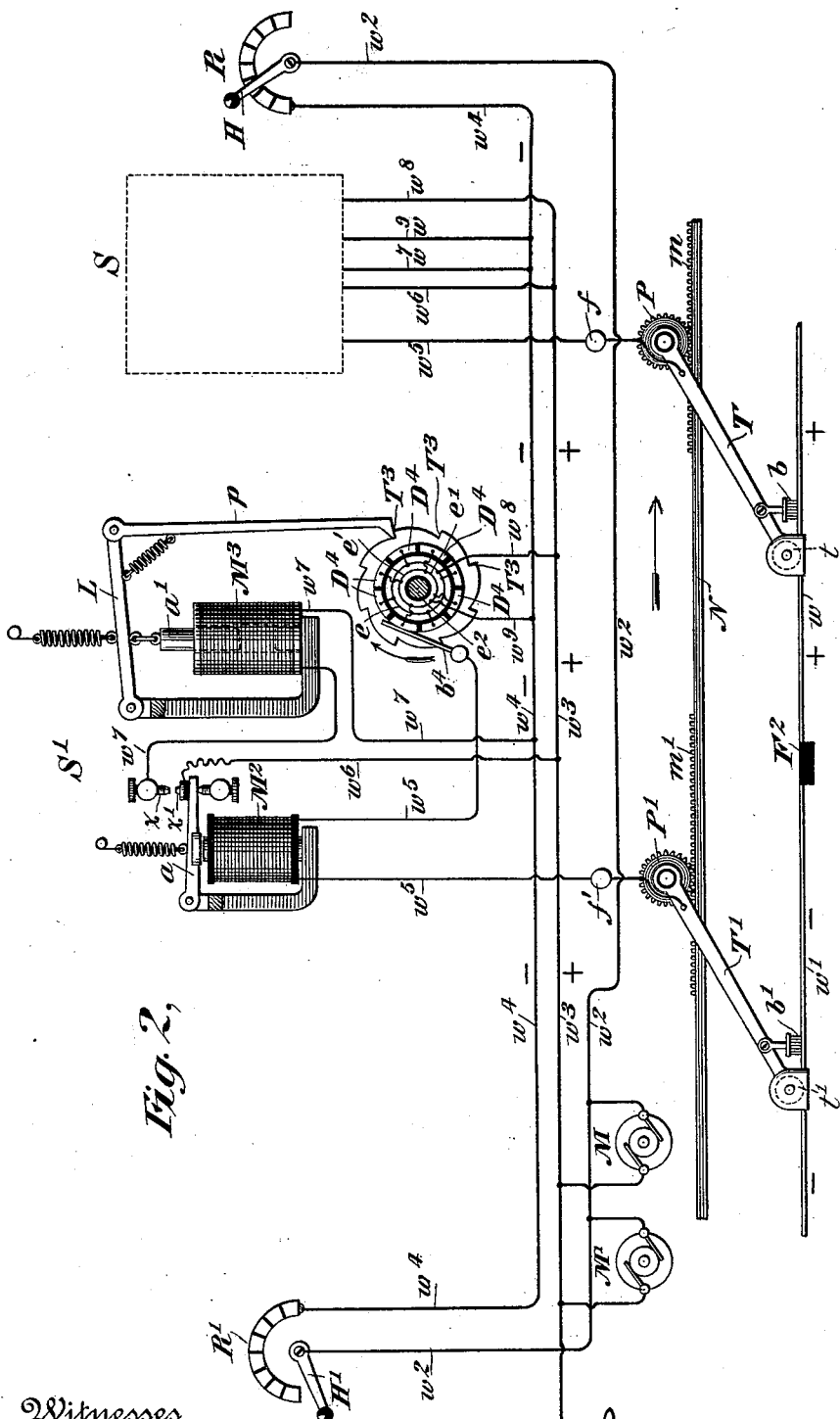
Figure 5:
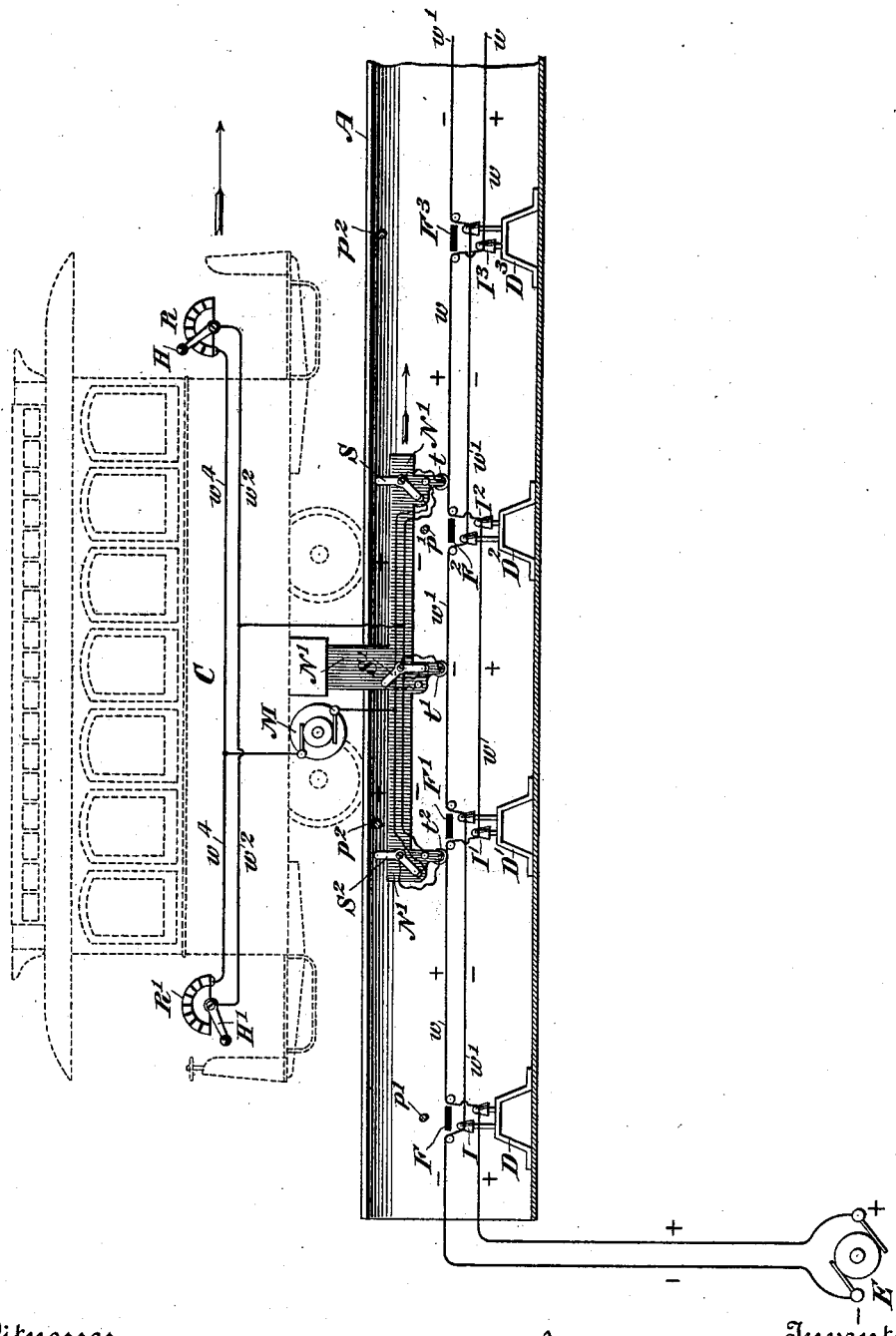

Figure 1 of the aforesaid drawings represents a longitudinal sectional view of a slitted conduit such as is in well known use in electric railways, a tram car being shown in elevation in dotted lines and the electrical and mechanical appliances in connection therewith from the generator to the propelling electric motors in diagrammatic view. Fig. 2 is a diagrammatic view of the operating electro-magnetic switches and circuit connections carried by each car. Figs. 3 and 4 are detail side and end views of one of the trolley arms and its attached parts, and Fig. 5 is a view in all respects similar to Fig. 1, of a modified form of the entire system in which mechanically actuated switches are caused to take the place of the electro-magnetic switches shown in Fig. 1.

Referring now to the drawings in detail in all of which like letters of reference represent like or equivalent parts, A represents a conduit having a narrow slit on its upper side on a level with the street as is usual in cable or analogous railways, and D, D', $D^2$, $D^3$, &c., a series of standards located in alignment with each other and secured to the bottom of the conduit. To the top of these standards are secured pairs of insulators I I' $I^2$ $I^3$, &c., to which insulators are attached the conducting mains or leads $w$ $w'$ running to the generator or dynamo E located at a generating station at any desired point on the route. It will be noticed that the leads $w$ and $w'$ cross or overlap each other alternately at their points of support which are at equal distances apart and that they both lie in substantially the same vertical plane so that the upper or exposed trolley conductor is made up of a series of sections in alignment with each other located directly under the slit in the conduit and that these successive sections are insulated from each other by blocks F F' $F^2$ $F^3$, &c., of insulating material supported by the standards D D' $D^2$ $D^3$, &c.

T T' and $T^2$ are trolley arms carrying conducting trolleys $t$ $t'$ and $t^2$ at their lower ends and pivoted dust or dirt removing brushes $b$ $b'$ and $b^2$, the trolley arms being preferably hollow and insulated on their outer surfaces in order to carry insulated conductors attached to their upper ends, the lower or concealed ends of which are electrically connected with the trolleys $t$ $t'$ and $t^2$. Beneath the bottom of the car is arranged in proper supports a sliding rack N, provided with three sets of rack teeth $m$ $m'$ and $m^2$ on its upper face adapted to mesh respectively with the teeth of pinions P P' and $P^2$. Each of the pinions is secured to a shaft G, and through a spiral spring $s$ (see Fig. 4) with a loosely pivoted trolley arm T T' or T², said trolley arms being insulated as shown, from the shafting and their elastic or yielding springs s. At the opposite ends of the rack N and in the side edges thereof are cut additional teeth n and n' into which are geared additional pinions P³ and P⁴ carried by operating shafting or rods r r' journaled in the dash board supports at the opposite ends of the car and provided with hand operating wheels h h'.

M M' are electric motors carried by the car and geared to the axles thereof in the usual manner, the commutator brushes of said motors being connected in multiple, as shown, with conductors w² and w³ the connections on one side through the conductor w² being made with operating switches H H' located at opposite ends of the car and those on the other side through the conductor w³ with the operative portions of the electro-magnetic switches in the switch boxes S S' and S², the function of which switches is to automatically reverse the connection of the trolleys as they move from contact with one wire to the opposite wire, i. e. from + to — and — to +. The two conductors w³ and w⁴ are connected with the trolley arms T T' and T² through the pole-changing switches S S' and S² illustrated in detail in Fig. 2, in such manner that as the trolley arms T T' and T² advance in the direction of the arrow (see Fig. 1) the direction of the current from the successive sections of the trolley conductors w w' is always in one direction through the motors, thereby avoiding undue heating effects and great loss of energy.

Referring now to Fig. 2 for a detailed description of the electro-magnetic pole-changing or switching apparatus which is duplicated in each of the switch boxes S S' and S², M² is a switch-controlling electro-magnet connected electrically by a conductor w⁵ directly with the trolley arm and a contact brush b⁴ resting on one of the conducting plates D⁴ of a rotary pole-changing switch. These conducting plates D⁴ are connected in alternate order as shown with internal conducting rings e e' which rings are connected in turn by short conductors w⁸ and w⁹ with the fixed conductors w³ and w⁴, the conductor w³ being in turn connected to the motors M M' in multiple arc.

M³ is a switch-operating electro-magnet connected on one side by a conductor w⁷ to the fixed conductor w⁴ and on the opposite side to a fixed electrical contact x. The armature lever a of the electro-magnet M² carries on its free end, but insulated therefrom, a movable contact point x', electrically connected through a branch conductor w⁶ with the fixed conductor w³. The rotary switch is provided with the ratchet teeth T³ equal in number to the number of conducting plates D⁴, and p is a pivoted pawl carried by a pivoted operating lever L operatively connected with the core a' of the electro-magnet or solenoid M³.

The operation of the entire apparatus illustrated in Figs. 1, 2, 3 and 4 is as follows: The car C (Fig. 1) is supposed to be traveling in the direction of the arrow and the propelling current passing from the plus pole of the generator E by the current main or lead w through the trolleys t and t² carried by the trolley arms T and T² and the current passing in multiple arc through the conductors w⁵ to the pole changing apparatus in the switch boxes S and S², the contact brushes b⁴ in both of these boxes at this time being in positions corresponding with the similar brush shown in the enlarged diagrammatic view in Fig. 2 so that the current passes through conductors w⁵, the electro-magnets M² of these two switch boxes, the contact brushes b⁴, those contact plates D⁴ in both boxes which are connected to the inner contact rings corresponding to e², thence still in multiple arc relation through conductors corresponding to w⁹ to the bus wire w⁴; thence through the front switch H to conductor w², thence through the motors M and M' in multiple arc relation to the other bus wire w³, thence through a branch conductor in the switch box S' corresponding to the conductor w⁸ to a conducting ring corresponding to the conducting ring e', thence through a contact brush b⁴ corresponding to the brush b⁴ seen in Fig. 2 but which in this instance in switch box S' is resting at this time upon the next segment D⁴ either just in the rear of the segment corresponding to D⁴ upon which the brushes corresponding to b⁴ of the switch boxes S and S² are now resting so that the current continues through the brush b⁴ of that box to the conductor corresponding to w⁵, electro-magnet M² by trolley arm T' through its trolley t' back by the return conductor w' to the other pole of the dynamo. As the car advances the trolleys t², t' and t successively pass over the insulating blocks F', F² and F³, thereby momentarily rupturing the circuit through the electro-magnets corresponding to M² in each of the switch boxes S², S' and S in succession demagnetizing the electro-magnets in those boxes corresponding to the electro-magnet M² seen in Fig. 2 of the drawings and permitting in this succession the closure of branch circuits in each of these switch boxes through electro-magnets or solenoids corresponding to the electro-magnet or solenoid M³ in a branch circuit corresponding to the circuits w⁶ w⁷, Fig. 2. This momentary closure of the circuit advances the pole-changing switch one step thereby changing the relation of the conducting plates D⁴ and conducting rings e' e² to the brush b⁴ in such manner that when the trolley t² passes onto the — section of the trolley wire w' between standards I' and I², the direction of the current will be maintained as before through the motors M and M', the only difference in the connections being that there are now two negative trolleys t' and t² instead of two positive trolleys t and t². The next trolley to actuate its pole-changing switch in sequence will be the trolley $t'$ as it passes over the insulating block $F^2$. Switch $S'$ in turn will reverse the current for that trolley so as to maintain its positive direction through the motor for the two $+$ trolleys which will then be on the $+$ section between the standards $I^2$ and $I^3$. It is apparent therefore that as the car advances the rotating pole changers in each of the switch boxes $S\ S'$ and $S^2$ will instantaneously and in sequence act to maintain the direction of the current always the same through the motors and that sparking and heating will therefore necessarily be avoided. On permanently interrupting the circuit at the switch H should the rotary pole changers all act on starting again the only effect would be to reverse the direction of the current through the motors until the next stop is made. By rotating either of the hand wheels $h$ or $h'$ in the proper direction the trolleys may be lifted entirely out of the conduit and by rotating either one or both in a reverse direction their pressure through the elastic or yielding springs $s$ on the trolley wires may be regulated. When it is desired to manipulate the car from the other platform the circuit is opened at the switch H and closed at switch $H'$. The necessary locking devices such as ratchet and pawl mechanism may be secured to the rods $r\ r'$ for locking them in any position.

$f\ f'$ and $f^2$ are fusible plugs or cut-outs of any preferred form designed to automatically rupture the circuit in the event of a short circuit occurring between any two of the trolleys.

In Fig. 5 I have shown a modified and much simpler form of apparatus in which the pole-changing devices $S\ S'$ and $S^2$ are in the nature of mechanical conducting switches pivotally secured to a support $N'$ carried by the car and extending into the slit in the conduit A. These pivoted switches are connected to the motor M carried by the car by conductors sustained by the support $N'$ as shown. $p'\ p^2$ are mechanical stops or pins secured either to the side of the conduit or supported by the standards $D\ D'\ D^2\ D^3$, &c., and lying directly in the path of the opposite ends of the pivoted switch levers $S\ S'$ and $S^2$. These pins are so arranged that as the car advances the switch levers $S\ S'$ and $S^2$ are mechanically moved in opposite directions. In other words, these three switches $S\ S'$ and $S^2$ are operated mechanically by the pins $p'$ and $p^2$ as the trolleys $t\ t'$ and $t^2$ pass the ends of the sections.

I do not limit myself to the specific apparatus herein described and shown for accomplishing the results sought as I believe it is broadly new with me to utilize two current mains in a slitted conduit in such manner that two or more trolleys may be used on sectional conductors located in alignment with the slit and in such manner that the trolleys may be lifted out of the conduit.

I am aware that it is not broadly new with me to arrange pairs of current mains in series of overlapping sections and to provide a current collecting device of three or more trolleys adapted to bridge said overlapping sections, in combination with current reversing devices carried by a moving vehicle adapted to maintain the direction of the current always the same through the propelling motor carried thereon, and I make no claim hereinafter broad enough to include such a structure.

Having thus described my invention, what I claim, and desire to secure by Letters Patent of the United States, is—

1. A pair of electrical conductors crossing each other at stated intervals and connected to the opposite poles of an electrical generator, in combination with a slitted conduit; the successive sections of the overlapping conductors lying in alignment with the slit of the conduit, substantially as described.

2. A pair of mains or leads located in a slitted conduit and overlapping each other at stated distances, the ends of the mains being connected to the opposite poles of an electrical generator, one portion of the sections made by the overlapping conductors being bare for trolley connections and the other portion covered with insulating material, substantially as described.

3. An electrical generator connected to a pair of mains or leads which overlap or cross each other at intervals, the overlapping portions being located in alignment with each other and directly beneath the slot of a surrounding slitted conduit.

4. A pair of mains or leads located in a slitted conduit and overlapping or crossing each other at intervals, in combination with three or more trolleys carried by a car and extending through the slit of the conduit into contact with the mains and having electrical connections with one or more propelling electric motors on board the car, substantially as described.

5. A pair of positive and negative trolley wires located in a slitted conduit and crossing each other at intervals so as to form succeeding sections in alignment and beneath the slit of the conduit, substantially as described.

6. A slitted conduit inclosing a pair of trolley wires located substantially in vertical alignment with or beneath the slit and three or more trolleys, one in advance of the other and extending into the slit and resting on said wires, substantially as described.

7. A conduit having a single slit, a pair of trolley wires located therein, three or more trolleys carried by a car and extending through the single slit and resting on the trolley wires in alignment with each other in the direction of the length of the slit and means for lifting the trolleys entirely out of the conduit, substantially as described.

8. Three or more trolley arms extending through a single slit in a conduit inclosing a pair of trolley wires, said trolley arms being located in alignment with each other in the direction of the length of the conduit, in combination with means for lifting said trolleys, all carried by a moving car, substantially as described.

9. Three or more trolley arms located one behind the other and extending into a single slit in a conduit, in combination with means for lifting all the trolley arms at will, substantially as described.

10. One or more trolley arms pivotally secured to a car and having each a pinion meshing with a sliding rack secured to the car, in combination with one or more pinions provided with one or more hand controlling wheels, substantially as described.

11. One or more trolley arms each secured to a yielding or elastic connection carried by a car and provided with a pinion meshing with a corresponding rack secured also to the car and pinion and hand operating mechanism for varying the angular position of the trolley arm or arms, all substantially as described.

12. Two or more trolley arms each provided with a pinion geared to a rack having longitudinal movement; a yielding connection between each trolley arm and its pinion in combination with hand actuating mechanism at each end of the car operatively connected with the rack.

CHARLES J. REED.

Witnesses:
C. J. KINTNER,
G. M. CHAMBERLAIN.